United States Patent Office 3,393,620
Patented July 23, 1968

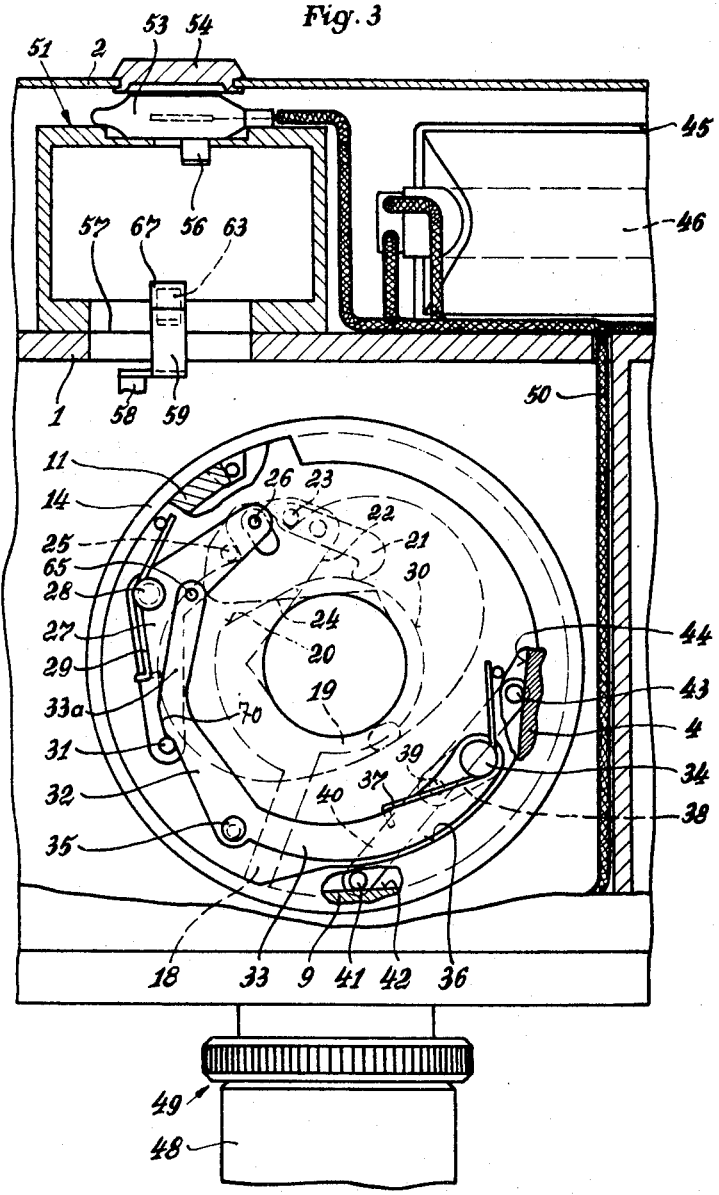

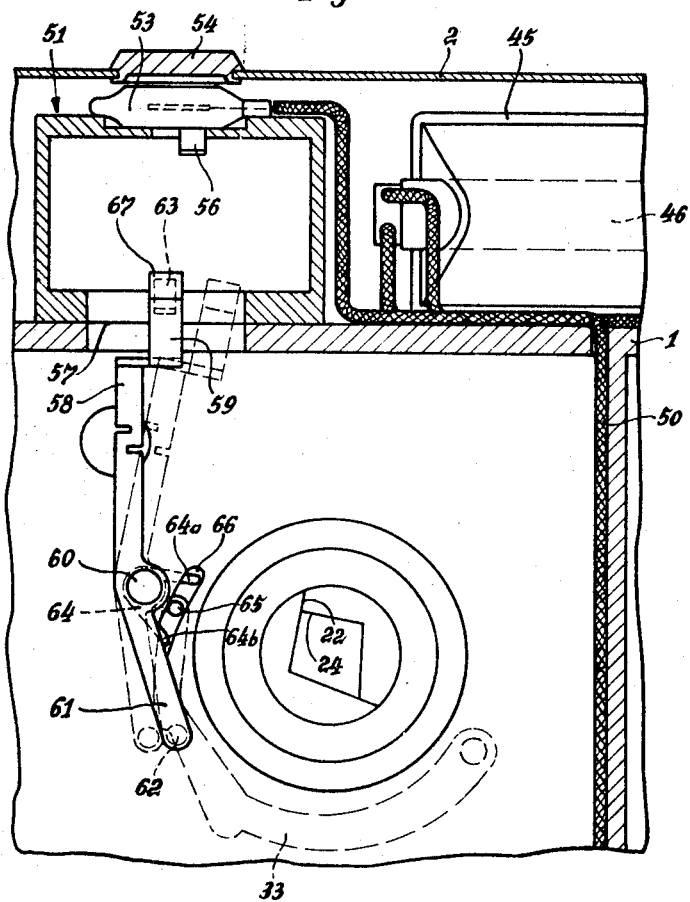
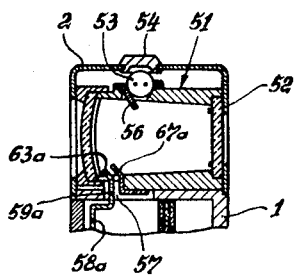

3,393,620
CAMERA CAPABLE OF MAKING
FLASH EXPOSURES
Wilhelm Reiche, Braunschweig, and Oskar Fischer,
Volkmarode, Germany, assignors to Voigtlander
A.G., Braunschweig, Germany, a corporation of
Germany
Filed Nov. 8, 1965, Ser. No. 506,759
Claims priority, application Germany, Nov. 11, 1964,
V 27,136
15 Claims. (Cl. 95—11)

ABSTRACT OF THE DISCLOSURE

A photographic camera having an indicator device for indicating when the camera has been properly set for making flash exposures, and a signal lamp for signaling when the photographic flash unit is in a firing condition. The indicator device is coupled to the distance-setting and diaphragm adjusting members of the camera and is visible in the viewfinder of the camera. The signal lamp is visible in the viewfinder and also serves to illuminate the indicator device.

---

The present invention relates to cameras.

In particular, the present invention relates to that type of camera in which a flash apparatus is at least partly built in. This particular type of camera will also have a viewfinder as well as diaphragm and a distance-setting means capable of setting into the camera the distance between the camera and the object which is to be photographed. In cameras of this type it is known to provide a coupling between the distance-setting means and the diaphragm so as to automatically set the diaphragm in order to make flash exposures with a diaphragm which is properly set to provide the proper aperture for a given flash guide number. Moreover, such cameras can be provided with indicating devices for indicating to the operator when at least one of the limiting positions of the diaphragm, such as that of the largest possible aperture, is reached. Such an indicating means can conveniently be situated so as to provide in the viewfinder a warning that the latter limiting position of the diaphragm has been reached.

Cameras of the above type have already been provided. With such cameras it is conventional to provide through the structure which couples the distance-setting means with the diaphragm-setting means a shifting of an indicating means in the form of a shiftable member carrying a pair of warning markers which become visible in the viewfinder as soon as the diaphragm has been set, in response to actuation of the distance-setting means, at one of its limiting positions. In this way the operator of the camera will realize when looking into the viewfinder that the camera has been set at a distance at which an exposure with flash illumination will provide either an over-exposure or and under-exposure. Inasmuch as photographs are in general made with flash illumination when there is little ambient light or even under conditions of complete darkness, it does not infrequently happen that the warning markers, in the form of simple lugs which move into the viewfinder, are not visible and the operator is therefore unaware of the fact that an improper exposure will be made.

In cameras into which at least part of an electron flash assembly is built, it is already known to provide a glow lamp visible in the viewfinder for indicating by its illumination that the electron flash apparatus is ready for operation. Thus, with this construction when the operator looks into the viewfinder he will know according to the illumination of the latter glow lamp whether or not the capacitor of the flash assembly has already been charged or whether he should wait until the flash assembly is ready to make the next exposure. Cameras of this latter type, however, do not have any structures for temporarily coupling the diaphragm to the distance-setting structure.

It is accordingly a primary object of the present invention to assure to the greatest possible extent faultless operation of cameras of the above type.

In particular, it is an object of the present invention to provide a camera which will indicate to the operator not only when the flash assembly is ready for operation, but also when making of a flash exposure will not give proper results.

In particular, it is an object of the present invention to provide a structure of the above type which requires a very small amount of components several of which perform a multiplicity of functions.

It is furthermore an object of the present invention to provide a structure capable of indicating to the operator even under poor lighting conditions, including complete darkness, when a proper exposure can be made with flash illumination.

A particular object of the present invention is to provide a camera of the above type which will use a single lamp not only for indicating to the operator when the flash assembly is ready for operation but also for illuminating an indicating means to indicate to the operator that a proper exposure cannot be made with flash illumination.

In particular, it is an object of the invention to provide a structure which will guarantee that under-exposures will not be made.

It is also an object of the invention to provide a structure which will guarantee that over-exposures will not be made.

Furthermore, it is an object of the invention to provide a structure which not only is composed of a relatively small number of parts, as pointed out above, but which in addition is exceedingly simple.

Yet another object of the present invention is to provide a structure which will give a very clear warning to the operator that a proper exposure cannot be made, even under conditions where the surrounding light is such that it would ordinarily be difficult to see the warning.

Also, the objects of the present invention include the provision of a structure where the indication of the readiness of the flash assembly to operate is clearly distinct from and can in no way be confused with the indication that a proper flash exposure will not be made.

Also the objects of the invention include the provision of a structure which while capable of giving certain information to the operator when the operator looks into the viewfinder, nevertheless will not detract in any way from the quality of the image which is seen through the viewfinder.

Furthermore, it is an object of the invention to provide a structure which will enable the operator to determine whether or not the flash assembly is ready for operation by looking at the exterior of the camera, without looking into the viewfinder thereof.

It is furthermore an object of the invention to utilize the structure which couples the diaphragm-setting structure to the distance-setting structure for the purpose of actuating the indicaing means which warns the operator that a proper exposure will not be made, so that this latter coupling structure will perform a multiplicity of functions and in this way will provide an exceedingly simple assembly composed of few components.

Primarily with the structure of the invention the camera will include a support means on which are mounted a viewfinder means, a diaphragm-setting means, and a distance-setting means for respectively viewing through the viewfinder the object which is to be photographed, setting the aperture, and setting the distance between the object and the camera. A flash means is also carried by the support means for making flash exposures. A coupling means is provided to cooperate with the distance-setting means and the diaphragm-setting means for coupling the distance-setting means to the diaphragm-setting means, when making flash exposures, so as to set the aperture automatically and in accordance with a given flash guide number when the distance-setting means is actuated. An indicating means responds to adjustment of the diaphragm-setting means by actuation of the distance-setting means for indicating when the region of the largest possible aperture is reached. A lamp means is situated adjacent and is visible in the viewfinder means for indicating when the flash means is ready for operation, and this lamp means also illumantes the indicating means.

The invention is illustrated by way of example in the accompanying drawings which form part of the application and in which:

FIG. 3 shows the position which the parts of FIG. 2 take when the diaphragm is set to provide the largest possible aperture and when the diaphragm-setting means is coupled with the distance-setting means through the coupling means;

FIG. 4 is a fragmentary vertical section of the camera of FIG. 1, taken along line IV—IV of FIG. 1 in the direction of the arrows, and showing the diaphragm at a position intermediate its largest and smallest sizes;

FIG. 5 is a fragmentary sectional side elevation showing another possible embodiment of an indicating means of the invention.

Figure 1:
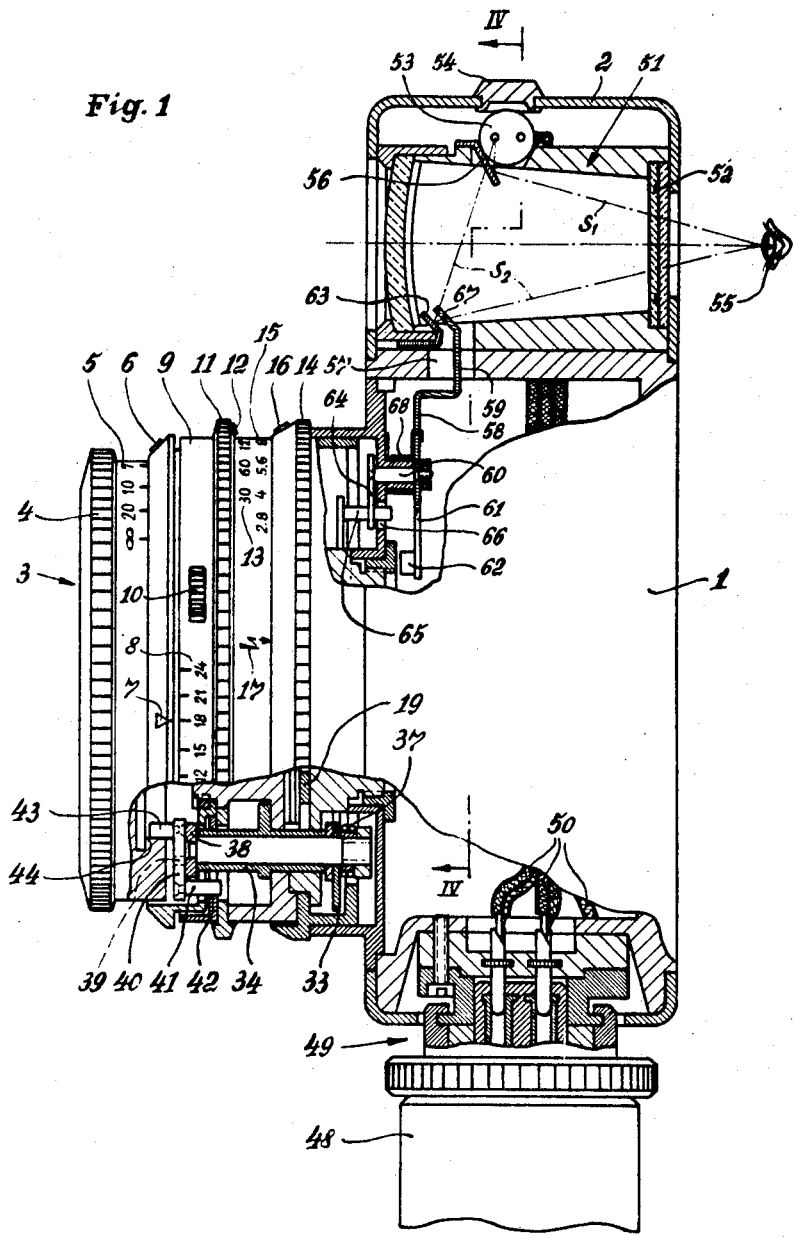
FIG. 1 is a partly sectional and partly fragmentary side elevation of one possible construction of a camera which includes the structure of the invention.

Referring now to the drawings, the camera illustrated therein includes a support means part of which is formed by the housing 1 of the camera. This housing or support means 1 carries a cap 2 situated at the upper part of the housing and defining with the top wall thereof a chamber in which various camera components such as the viewfinder thereof are situated in a well known manner.

The support means 1 in addition carries an objective assembly 3 which includes the structure for carrying the lenses of the objective as well as a between-the-lens shutter. In addition, the objective assembly includes a distance-setting means in the form of a rotary ring 4 capable of being turned by the operator and situated at the front end of the objective 3. This distance-setting means 4 includes a scale of graduations 5 indicating various distances between the camera and the object which is to be photographed, and the graduations of the scale 5, which turns with the ring 4, are capable of being selectively aligned with a stationary index 6. The part of the objective which carries the stationary index 6 carries a second stationary index 7 with which a scale 8 of film speeds is adapted to cooperate. The scale 8 is carried by a rotary ring 9 of the objective assembly, and this ring 9 has a knurled projection 10 which facilitates grasping and turning of the film-speed setting ring 9 by the operator. Furthermore, the objective assembly includes an exposure-time setting ring 11 carrying an index 12 capable of being selectively aligned with a graduation of a stationary scale 13. The objective assembly 3 also includes a diaphragm-setting means, and this latter means includes the rotary ring 14 which carries an index 16 capable of being aligned with a selected graduation of the scale 15 of aperture sizes. The scale 15 not only is stationary, in addition it forms an initial adjusting range for providing a selected one of a plurality of different aperture sizes. The index 16 can be turned so as to be placed in alignment with a flash symbol 17 which is also stationary and which forms a second adjusting range for the aperture settings.

Figure 2:
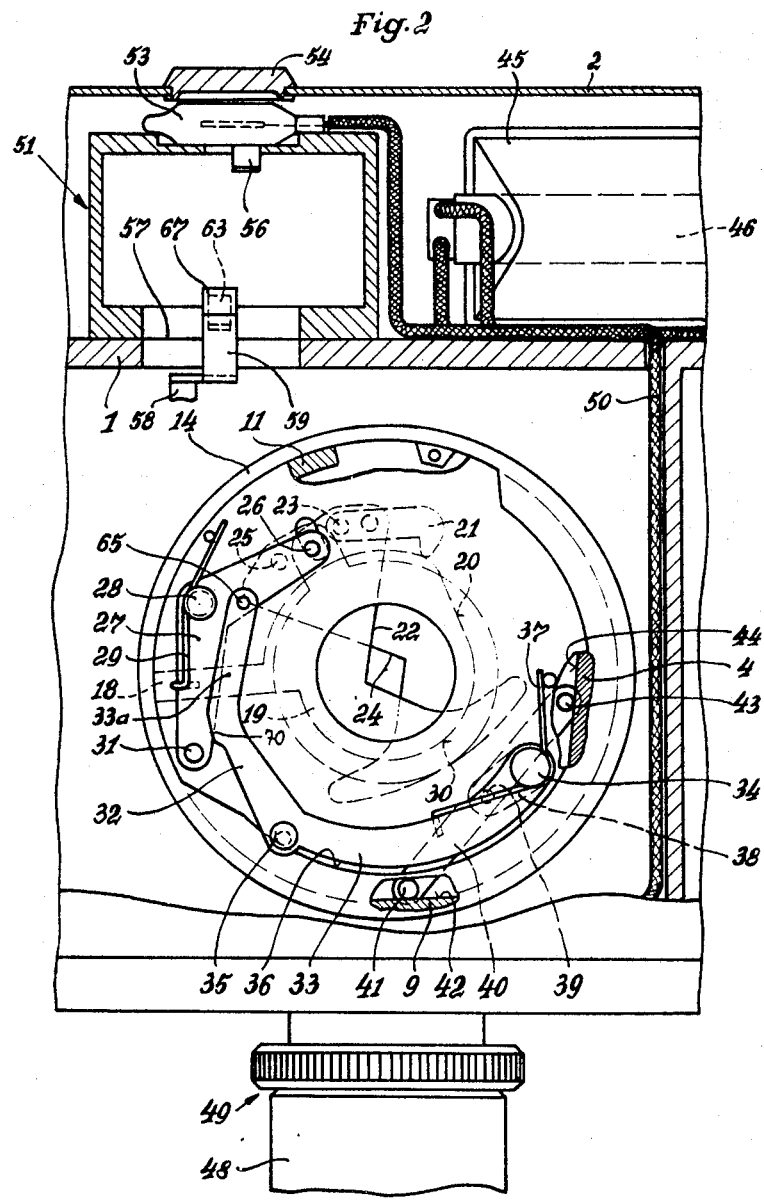
FIG. 2 is a fragmentary sectional rear view of the camera of FIG. 1 showing the diaphragm at its position providing the smallest aperture, the diaphragm setting means being uncoupled from the distance-setting means when the parts have the position of FIG. 2.

As is particularly apparent from FIGS. 2 and 3, the rotary ring 14 of the diaphragm setting means is fixed with a radially extending bar 18 which at its inner end is fixed with a cam ring 19 having at its outer periphery an aperture determining camming edge portion 20. This camming edge portion 20 is engaged by the free end of a control arm 21 which is fixed with a diaphragm blade 22 which forms one of the two blades of the illustrated diaphragm. This diaphragm blade 22 is pivotally supported by a stationary pivot 23 which at the same time serves as a bearing for the turntable control arm 21. The second blade 24 of the diaphragm is turnable about a stationary pin 25. Both of the blades 22 and 24 are formed, in a known way, with control slots which always overlap each other at least partially. At the location where these control slots cross over each other, a control pin 26 extends through both of these slots. Thus, the movement of the pair of diaphragm blades 22 and 24 is controlled by the pin 26 which correlates the movements of the blades. This control pin 26 is fixedly carried by the end of a control lever 27 which is supported for turning movement by a pivot pin 28 which at the same time carries a spring 29 which engages the lever 27 so as to urge it to turn in a counter-clockwise direction, as viewed in FIGS. 2 and 3. The pin 26 is therefore urged to maintain the diaphragm blades 22 and 24 in a position which will be determined by engagement of the control arm 21 with the periphery of the cam 19. In other words, the spring 28 acts on the lever 27 in such a way as to provide through the pin 26 on the diaphragm blades a force tending to turn them in a direction which will urge the lever 21 into engagement with the periphery of the cam 19.

In the position of the parts which is illustrated in FIG. 2 the rotary diaphragm setting ring 14 has been placed in an angular position in which the cam 19 is angularly positioned so as to provide through the camming edge 20 and the control arm 21, and thus through the blade 22 and the blade 24 coupled thereto by the pin 26, an aperture which is the smallest possible aperture which can be provided by the blades 22 and 24. When the ring 14 is turned in a counter-clockwise direction, as viewed in FIGS. 2 and 3, so that the cam 19 also turns in the same direction, the control arm 21, under the force of the spring 29, will be so positioned by the camming edge 20 that the aperture provided by the blades 22 and 24 will increase in size until the largest possible aperture is reached. In this way the manual setting of the diaphragm by matching selected graduations of the scale 15 and the index 16 is provided.

When the ring 14 is turned so as to displace the index 16 beyond the scale 15 into alignment with the flash symbol 17, then the camming edge portion 30 of the ring 19, which forms a continuation of the camming edge portion 20 thereof and which is concentric with the turning axis of the ring 19, engages the control arm 21. Because the camming edge portion 30 extends along a circle whose center is in the turning axis of the ring 19, the continued turning of the ring 19 when the index 16 is in the region of the symbol 17 will make no change in the diaphragm setting. At this time the diaphragm will remain at its setting which provides the largest aperture, as is apparent from FIG. 3.

During this movement of the ring 14 from the region where the apertures are manually selected to the second region where flash exposures are to be made, the diaphragm blades 22 and 24 are coupled with the camera structure which sets the distance between the camera and the object to be photographed, as well as the camera structure which introduces the factor of the film speed. As a result the diaphragm will at this time be automatically set in a proper manner according to the particular flash guide number. The control lever 27 carries a pin 31 which, when the largest aperture size is reached, comes into engagement with an arm 32 of a coupling lever 33, which forms part of the coupling means for coupling the diaphragm-setting means to the distance-setting means. This coupling lever 33 is fixed to a rotary shaft 34 which extends parallel to the optical axis and is supported for rotary movement in any suitable bearing structure within the housing of the shutter and objective assembly. The coupling lever 33 carries an adjustable pin 35 which is eccentrically mounted so that it is capable of being adjusted in accordance with its angular position on the lever 33. This pin 35 is shown in FIG. 2 in engagement with an inner camming edge 36 which forms part of the rotary diaphragm-setting ring 14. As a result of the engagement between the camming edge 36 and the pin 35, the coupling means, through its lever 33, is maintained at a position where the coupling means will have no influence on the setting of the diaphragm. Thus, in this position of the parts the index 16 will cooperate with the scale 15 and the diaphragm will be manually set without any interference from the coupling means.

A spring 37 is coiled about the rotary shaft 34 and presses with one of its legs against the lever 33 so as to urge the lever 33 to turn in a counter-clockwise direction, as viewed in FIGS. 2 and 3. In this way the spring 37 urges the lever 33 to turn in a direction where the pin 35 carried thereby will come into engagement with the cam 36. When, however, the ring 14 is turned from the position of FIG. 2 into the position of FIG. 3, the cam 36 moves beyond the pin 35. Now the coupling lever 33 can, together with the shaft 34, turn until the arm 32 engages the pin 31 of the control lever 27. Then the lever 27 will control the pin 26 so as to actuate the blades 22 and 24 in accordance with the position of the coupling lever 33. At this time the control arm 21 will become situated at a greater or lesser distance from the camming edge 30 of the ring 19.

The coupling lever 33 has an outer edge portion 70 which extends along a circle whose center is in the axis of the shaft 34. In this way it is possible to turn the distance-setting ring beyond the position where the smallest aperture is provided. At this time the outer edge portion 70 will simply slide along the pin 31 without moving the latter or the lever 27. A corresponding outer edge portion of the coupling lever can be provided with the curvature of a circle whose center is in the turning axis of the shaft 34 in order to maintain the parts at a position providing the largest aperture while the ring 4 is turned beyond the position where the largest aperture is provided.

The shaft 34 fixedly carries a coupling arm 38 at whose end is situated a pivot pin 39 which forms a bearing on which a totalizing lever 40 is mounted for turning movement. This lever 40 carries at one end a cam-follower pin 41, which engages the cam 42 which is fixed to and forms part of the adjusting ring 9 which sets into the camera the speed of the film which is exposed therein. At the other end of the lever 40 is situated a cam-follower pin 43 which engages the cam 44 which is fixed to and forms part of the distance-setting ring 4. As a result of the action of the spring 37 the cam-follower pins 41 and 43 are maintained in engagement with the cams 42 and 44, respectively.

When the ring 9 is turned so as to introduce into the camera the factor of the speed of the film which is to be exposed therein, the cam 42 engages the cam-follower pin 41 so as to turn the lever 40 to an angular position corresponding to the film speed, and this will determine the location of the pivot axis for the lever 40 provided by the pin 41 thereof. During the subsequent turning of the ring 4 so as to set the camera in accordance with the distance between the camera and the object to be photographed, the cam 44 will displace the pin 43 while the lever 40 turns about the axis of the pin 41, and thus the lever 40 assumes an angular position determined by the combination of the settings of film speed and distance. This turning of the lever 40 will, of course, result in a change in the position of the pin 39 and thus in a change in the angular position of the lever 38, so that the shaft 34 and thus the coupling lever 33 will turn, and in this way the turning will be transmitted through the pin 31 to the lever 27 so as to result in setting of the diaphragm blades 22 and 24 to provide an aperture which will be proper for the selected film speed and the distance between the camera and object which is set by the turning of the ring 4. In this way the camera will be automatically set to provide a proper exposure in accordance with the intensity of the light given off by the particular flash assembly. When the distance between the camera and the object is changed, the aperture size will be changed in the above-described manner so as to be proper for the given flash guide number.

On the other hand, when the film-speed setting ring 9 is turned, there is also a corresponding change in the diaphragm-setting, since in this case the totalizing lever 40 will be turn at its end which carries the pin 41 about an axis coinciding with the axis of the pin 43. In this case also the location of the pin 39 will change so that the shaft 34 will turn to automatically set the aperture in the above-described manner.

When the diaphragm-setting ring 14 is returned from the position of FIG. 3 into the position of FIG. 2, the cam 36 will engage the pin 35 so as to turn the coupling lever 33 to a location where its arm 32 assumes a position corresponding to that of the largest possible aperture which can be provided by the diaphragm. Thus, the coupling lever 33 and the parts controlled thereby are now in a condition where they will have no influence on the setting of the diaphragm. The setting of the blades 22 and 24 then takes place, as indicated above, through the camming edge 20 and the control arm 21 whose position is controlled thereby.

With the camera described above and shown in the drawing, parts of an electron flash assembly are built into the camera. Within the interior of the cap 2 is situated a reflector 45 in front of which is situated the elongated flash tube 46. This reflector 45 is covered in front by a prismatic plate. Within the cap 2 are also situated further components of the electron flash assembly, such as for example, the ignition device, a direct current converter, and an automatic control device for maintaining constant the extent to which a storage capacitor is charged.

The remaining elements of the electron flash assembly, including at least the source of current and the storage capacitor, are situated within a housing 48 which is separate from the camera and which functions as a hand-grip. This housing 48 can, by means of the mechanical and electrical coupling structure 49, be connected to the camera housing 1 in such a way that the components of the electron flash assembly situated in the interior of the camera are operatively connected with the components of the electron flash assembly situated in the housing 48 in such a way as to form a complete electron flash assembly. The components within the housing 48 are connected with the components within the camera through the electrical conductors 50.

The cap 2 also serves to house the viewfinder 51 which in the illustrated example is an Albada finder having frame limits 52 capable of being reflected into the viewing field of the viewfinder. Above the viewfinder is a glow lamp 53 which becomes illuminated when the electron flash assembly is ready for operation, which is to say when the flash capacitor is charged. The glow lamp 53 is on the one hand visible through a window 54 carried by the upper wall portion of the cap 2 and on the other hand is visible to the operator when looking into the viewfinder. Thus, when the operator's eye 55 looks into the viewfinder 51, as indicated in FIG. 1, a semi-transparent reflector 56 will direct light from the lamp 53 to the eye 55 of the operator. The light from the lamp 53 is directed by the reflector 56 along the path $S_1$ to the eye of the operator, as indicated in FIG. 1. Thus, by simply looking into the viewfinder it is possible for the operator of the camera to know whether or not the flash apparatus is ready for operation.

The top wall of the camera housing or support means 1 is formed with an opening 57 in the region of which is located an indicating means for indicating in the viewfinder when a proper exposure can be made. This indicating means includes the warning lever 58 having an upper end 59 which extends through the opening 57 into the interior of the viewfinder at a lower portion thereof. This warning lever 58 is fixed to a rotary pivot pin 60 which is turnable together with the lever 58 on the support means 1 at a suitable bearing thereof, as indicated in FIG. 1. At the end of the warning lever distant from its upper portion 59, the warning lever carries a counter-balancing arm 61 on which a counterweight 62 is fixed (FIG. 4). A spring 68, which is visible in FIG. 1, acts on the lever in such a way as to yieldably maintain the lever 58 in a non-indicating intermediate rest position shown in solid lines in FIGS. 1–4. Thus, the spring 68 engages the lever 58 with a pair of springy legs which provide equal and opposite forces on the lever maintaining the latter yieldably in the intermediate position indicated in FIGS. 2–4 in solid lines. The upper end 59 of the warning lever forms a covering member 67 which serves as a cover member for a stationary indicating element 63. The covering member 67 is opaque and it is neither reflecting nor transparent. When the lever 58 is in its central, non-indicating position, the cover member 67 is in a fully overlapping relationship with and covers the indicating plate 63 which is stationary and fixedly carried by the camera support means in the manner shown most clearly in FIG. 1. The indicating element 63 is transparent and is made of a striking, readily visible color, such as red. When the plate 63 is not covered, which is to say when the elements 63 and 67 have a non-overlapping relationship with respect to each other, the illumination from the lamp 53 will reach the warning plate 63 so as to illuminate the latter. The warning plate 63 will then become visible to the eye 55 of the operator at the lower edge portion of the viewfinder. At this time the light from the plate 63 will reach the eye 55 of the operator along the light path $S_2$, indicated in FIG. 1. It is to be noted that this plate 63 will also be visible under conditions of strong ambient light intensity, since at this time the light entering the viewfinder 51 from the outside will cause the plate 63 to stand out as a result of its coloring.

The indicating lever 58 includes, in addition to the pivot 60, a projection in the form of a bifurcated lever 64 fixed to the pin 60 and having a pair of bifurcations 64a and 64b indicated in FIG. 4. Between the bifurcations is situated a projection 65 in the form of a pin which is fixed to an extension 33a of the coupling lever 33 and which extends through a slot 66 formed in the front wall of the camera housing and extending along an arc which forms part of a circle whose center is in the turning axis of the shaft 34. The bifurcations 64a and 64b extend into the path of movement of the pin 65 in such a way that one or the other of these bifurcations are moved by the pin 65 when the coupling lever 33 moves up or down, as viewed in FIG. 4, to the limiting positions where the diaphragm will provide through the lever 27 the largest or smallest possible aperture sizes. In FIG. 4 the warning lever 58 is shown in dotted lines in the position it takes when the diaphragm has been set to the smallest possible aperture size. When, therefore, in the above described manner, the diaphragm is set by means of the ring 4 in one of its limiting positions, then the displacement of the upper end 59 of the lever 58 to an indicating position where it is in a non-overlapping relationship with respect to the warning plate 63, will uncover the latter so that this reflecting plate will become visible in the viewfinder.

In the embodiment of FIG. 5, the warning lever 58a has an upper end 59a which itself is made of a reflecting transparent and strikingly colored warning plate 63a. In the non-indicating rest position of the lever 58a, this warning plate 63a thereof is covered by the stationary, opaque covering plate 67a which is now in a full overlapping relationship with respect to the warning plate 63a. This warning plate 63a will shift laterally out of its overlapping relationship into an indicating non-overlapping relationship with respect to the plate 67a when the warning lever 58a is turned to a position corresponding to the limiting positions of the diaphragm.

The angular distance between the bifurcations 64a and 64b can be chosen in a number of different ways. Thus, it can be chosen in such a way that the warning marks 63 or 63a of the indicating means will start to become visible when the diaphragm approaches one of its limiting positions and only becomes fully visible when the limiting position of the diaphragm is reached, which is to say when the aperture is at its largest or smallest possible size. On the other hand, it is also possible to so choose the distance between the bifurcation 64a and 64b that when the actual position of the largest or smallest aperture is reached, the indicating means only starts to become visible and becomes fully visible only when the setting structure moves beyond the limiting positions of the diaphragm. A third possibility resides in rendering the indicating means visible as a warning only in the case where one of the limiting positions of the diaphragm is reached, so that with this third possibility absolutely no indication will be given to the operator except when the structure has been set beyond the position where the largest or smallest possible aperture is provided. The first of the above possibilities, namely providing full visibility when the limiting position is reached and partial visibility as this limiting position is approached, has the advantage of warning the operator when the limiting position is approached so that an advance warning is given. The third possibility provides the advantage of preventing the operator from seeing the indicating means during manual setting of the camera even when the camera is manually set to provide the largest or smallest aperture. The second of the above choices, however, provides a compromise between the extremees of the first and third choices.

The invention of course is not limited to the particular details described above and shown in the drawings. For example, the invention can also be used in those cases where the flash apparatus built into the camera, instead of being an electron flash assembly, is a conventional flash assembly requiring the flash lamps to be replaced with each exposure. In this case the glow lamp 53 is replaced by a simple lamp which is illuminated upon actuation of the flash apparatus.

It is to be noted that with the embodiment of FIG. 5 where the transparent, brightly colored warning plate 63a moves with the lever 58a, the operator is given a moving warning, which is particularly easy to notice. This particular embodiment is therefore of special advantage when a range finder is coupled with the objective. The advantage of making the warning plate transparent and of a bright color and of situating it in the region where it will receive light from the exterior, resides in the fact that under conditions of bright ambient illumination the light from the glow lamp may not be readily visible, so that under these conditions the outside light will still serve to render the indicating means readily visible to the operator. In this case the light entering from the exterior illuminates the indicating means from the rear, which is to say from the front of the camera, and makes it coloring very clearly visible.

Of course, the arrangement of the lamp 53 at the upper part of the viewfinder and the indicating means of the invention at the lower part thereof will reliably provide two distinct indications, one of which cannot be confused with the other. At the same time the capability of easily connecting the indicating means with its controlling elements which in this case need be situated only at a relatively short distance from the indicating means, is provided.

The embodiment where the indicating element 63 is stationary is also of particular advantage. In this case the indicating element 63 will contrast sharply with the relatively dark covering element 67. When the lever 58 starts to turn so that the covering element 67 moves into its non-overlapping relation with respect to the indicating element 63, the contrast between the brightly colored element 63 and the dark element 67 will cause the warning element 63 to stand out sharply and be readily visible to the operator. Without this contrast it would be difficult under conditions of intense illumination for the operator to see the element 63 even if it were brightly colored.

Of course, various of the elements of the invention described above and shown in the drawings can be used in combinations other than those described above and shown in the drawing, without departing from the invention.

What is claimed is:

1. In a camera, support means, viewfinder means, diaphragm-setting means, and distance-setting means carried by said support means for respectively viewing the object to be photographed, setting the aperture through which an exposure is made, and setting into the camera the distance between the object and the camera, flash means carried by said support means for making flash exposures, coupling means cooperating with said distance-setting means and diaphragm-setting means for coupling said distance-setting means to said diaphragm-setting means, when making flash exposures, to set said aperture automatically in accordance with a predetermined flash guide member when said distance-setting means is actuated to set into the camera the distance between the object and the camera, indicating means responding to adjustment of said diaphragm-setting means by said distance-setting means for indicating when the region of the largest possible aperture which can be set by said diaphragm-setting means is reached, and lamp means situated adjacent and visible in said viewfinder means for indicating, when illuminated, that said flash means is ready for operation, said lamp means also illuminating said indicating means.

2. The combination of claim 1 and wherein said indicating means also responds to setting of said diaphragm-setting means by said distance-setting means, through said coupling means, to indicate when the region of the smallest possible aperture has been reached by said diaphragm-setting means, and said lamp means also illuminating said indicating means when it indicates that the region of the smallest possible aperture has been reached.

3. The combination of claim 1 and wherein said indicating means includes a light-reflecting plate and a cover movable one with respect to the other between a position where said cover and plate are in non-overlapping relationship with respect to each other when said region of said largest aperture is reached to expose said plate to the light from said lamp means and a position where said cover and plate are in an overlapping relationship to cover said plate from the light of said lamp means when said aperture is at a size other than the region of its largest possible size.

4. The combination of claim 1 and wherein said indicating means includes a light-reflecting plate member and a cover member having with respect to each other an overlapping relationship where said cover member covers said plate member to prevent light from said lamp reaching said plate member, said members having said overlapping relationship when the aperture is in a position other than the region of its largest possible size, and said members having a non-overlapping relationship when the aperture is in the latter region for exposing said plate to light from said lamp, said indicating means including a lever turnably carried by said support means and carrying one of said members, said lever having a rest position where said members are in said overlapping relationship with respect to each other, and said diaphragm-setting means engaging said lever and turning the latter to place said members in said non-overlapping relationship with respect to each other when the aperture is in the region of its largest possible size.

5. The combination of claim 4 and wherein said plate member is stationary and said cover member is carried by said lever.

6. The combination of claim 4 and wherein said cover member is stationary and said plate member is carried by said lever.

7. The combination of claim 4 and wherein said plate member is transparent and provided with a readily visible color, and said plate member also being situated in the path of light which passes into said viewfinder means.

8. The combination of claim 1 and wherein said viewfinder means has lower and upper portions where said indicating means and lamp means are respectively situated.

9. The combination of claim 1 and wherein a semi-transparent reflector is situated between said lamp means and indicating means for rendering said lamp means visible to the operator while permitting light to pass from said lamp means to said indicating means.

10. The combination of claim 1 and wherein a wall is carried by said support means at the exterior of the camera and is formed with a window through which said lamp means is visible from the exterior of the camera.

11. The combination of claim 1 and wherein said indicating means includes an indicating lever turnably carried by said support means for turning movement from a predetermined non-indicating rest position to an indicating position indicating when said aperture is in the region of its largest size, said coupling means including a coupling lever which turns in response to actuation of said distance-setting means and which actuates said diaphragm-setting means to set the latter when said distance-setting means is adjusted, said indicating lever having a portion situated in the path of movement of a portion of said coupling lever when the latter actuates said diaphragm-setting means to provide an aperture in the region of the largest possible aperture for automatically displacing said indicating lever to said indicating position thereof when said coupling lever actuates said diaphragm-setting means to provide an aperture in the region of the largest possible aperture.

12. The combination of claim 11 and wherein said portion of said indicating lever is bifurcated and said portion of said coupling lever is in the form of a projection situated between the bifurcations of said indicating lever and engaging one of said bifurcations to turn said indicating lever to said indicating position thereof, said projection of said coupling lever engaging the other of said bifurcations for turning said indicating lever to a second position where said indicating means will indicate the region of the aperture of smallest possible size.

13. The combination of claim 1 and wherein said indicating means starts to provide an indication of the largest possible aperture setting just before the latter setting is reached and provides a full indication when the largest possible aperture setting is reached.

14. The combination of claim 1 and wherein said indicating means starts to provide an indication when the largest possible aperture setting is reached and provides a full indication only when the aperture setting is beyond the region of the largest possible aperture.

15. The combination of claim 1 and wherein said indicating means provides an indication when the largest possible aperture setting is exceeded.

References Cited

UNITED STATES PATENTS

| | | | |
|---|---|---|---|
| 3,257,920 | 6/1966 | Greger et al. | 95—11 |
| 3,357,328 | 12/1967 | Kinder et al. | 95—11 |

NORTON ANSHER, *Primary Examiner.*

FRED L. BRAUN, *Assistant Examiner.*